(12) United States Patent
Singh

(10) Patent No.: US 11,316,329 B2
(45) Date of Patent: Apr. 26, 2022

(54) UNIVERSAL WALL PLATE FOR ELECTRICAL DEVICES

(71) Applicant: Angad Singh, Potomac, MD (US)

(72) Inventor: Angad Singh, Potomac, MD (US)

( * ) Notice: Subject to any disclaimer, the term of this patent is extended or adjusted under 35 U.S.C. 154(b) by 16 days.

(21) Appl. No.: 16/591,732

(22) Filed: Oct. 3, 2019

(65) Prior Publication Data

US 2021/0104878 A1    Apr. 8, 2021

(51) Int. Cl.
*H02G 3/14*    (2006.01)
*H02G 3/08*    (2006.01)
*H01H 23/04*   (2006.01)
*H01R 13/52*   (2006.01)

(52) U.S. Cl.
CPC ............ *H02G 3/081* (2013.01); *H01H 23/04* (2013.01); *H01R 13/5213* (2013.01); *H02G 3/14* (2013.01)

(58) Field of Classification Search
CPC . H02G 3/14; H02G 3/08; H02G 3/081; H01R 25/006; H01R 13/5213; H01R 13/52; H01H 9/02; H01H 9/04
USPC .............. 174/66, 67, 53, 481; 220/241, 242; 439/535, 142, 536
See application file for complete search history.

(56) References Cited

U.S. PATENT DOCUMENTS

| | | | | |
|---|---|---|---|---|
| 3,437,738 A  * | 4/1969 | Wagner | ...................... | H02G 3/14 174/55 |
| 5,675,125 A  * | 10/1997 | Hollinger | ................. | H02B 1/26 174/66 |
| 5,744,750 A  * | 4/1998 | Almond | .................. | H02G 3/185 174/66 |
| 6,051,788 A  * | 4/2000 | Nichols | ................ | H01R 13/443 174/67 |
| 6,680,438 B1 * | 1/2004 | Campbell | .............. | H01H 23/04 174/66 |
| 7,381,895 B1 * | 6/2008 | Shotey | .................... | H02G 3/081 174/66 |
| 7,582,830 B2 * | 9/2009 | Claffy | ...................... | H02G 3/14 174/66 |
| 7,683,257 B1 * | 3/2010 | Shotey | ..................... | H02G 3/14 174/66 |
| 7,939,756 B2 * | 5/2011 | Daniels | .................... | H02G 3/14 174/66 |
| 8,158,885 B2 * | 4/2012 | Eastin | ...................... | H02G 3/14 174/66 |
| 8,835,764 B2 * | 9/2014 | Seff | ...................... | H02G 3/0493 174/67 |
| 9,608,418 B1 * | 3/2017 | Elberbaum | .............. | H02G 3/16 |
| 10,003,181 B2 * | 6/2018 | Korcz | ...................... | H02G 3/14 |

* cited by examiner

*Primary Examiner* — Angel R Estrada

(57) ABSTRACT

The invention discloses a smaller Universal Wall Plate (5) to fit and cover a device-hole (10) in a bigger outer wall plate (6). A device-hole exposes the front-end of an electrical device (such as a switch), installed behind the wall plate, for access by the user. The outer wall plate (6) is used for covering and mounting electrical switches, outlets and other devices on walls or other flat surfaces.

5 Claims, 2 Drawing Sheets

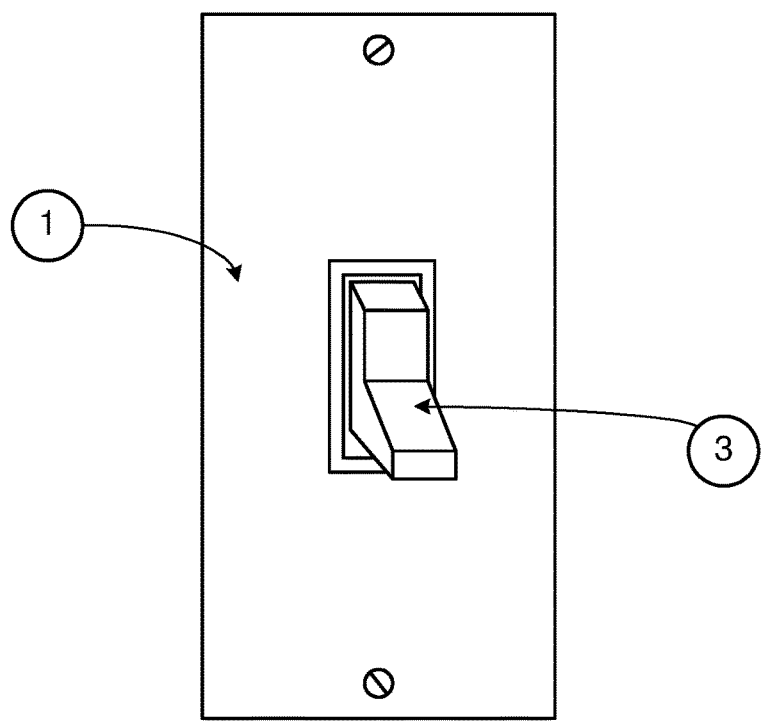
Figure 1. Toggle Switch and Wall Plate (Prior Art)
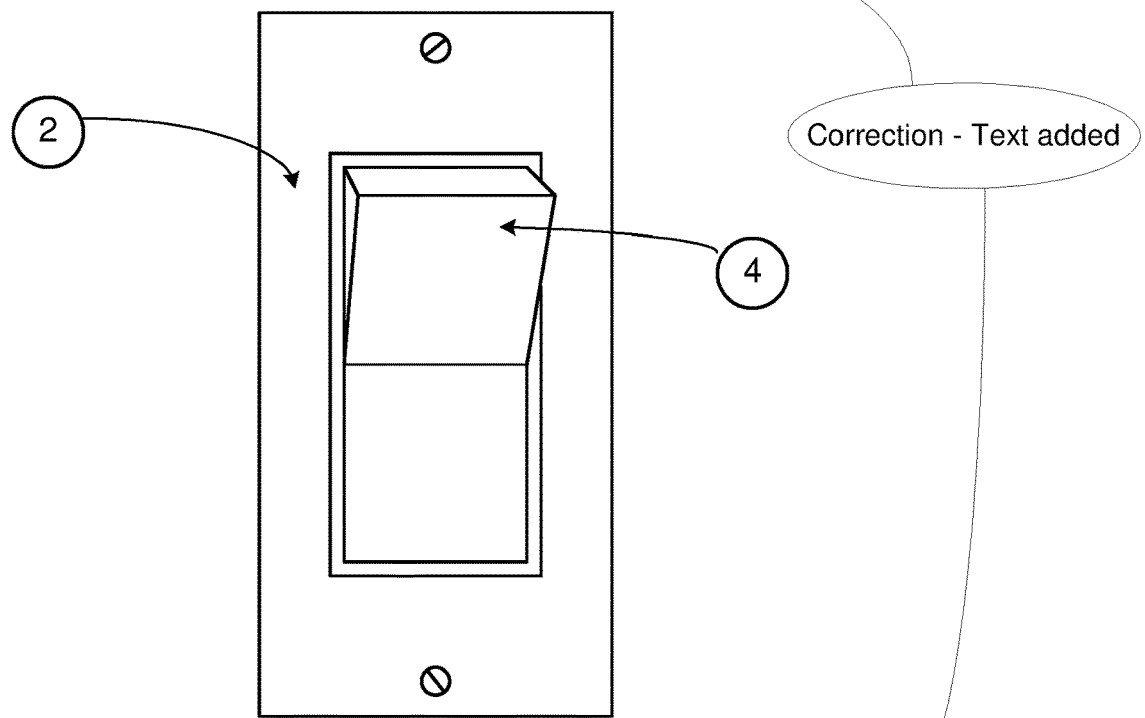
Figure 2. Rocker Switch and Wall Plate (Prior Art)
Signature: /Angad Singh/

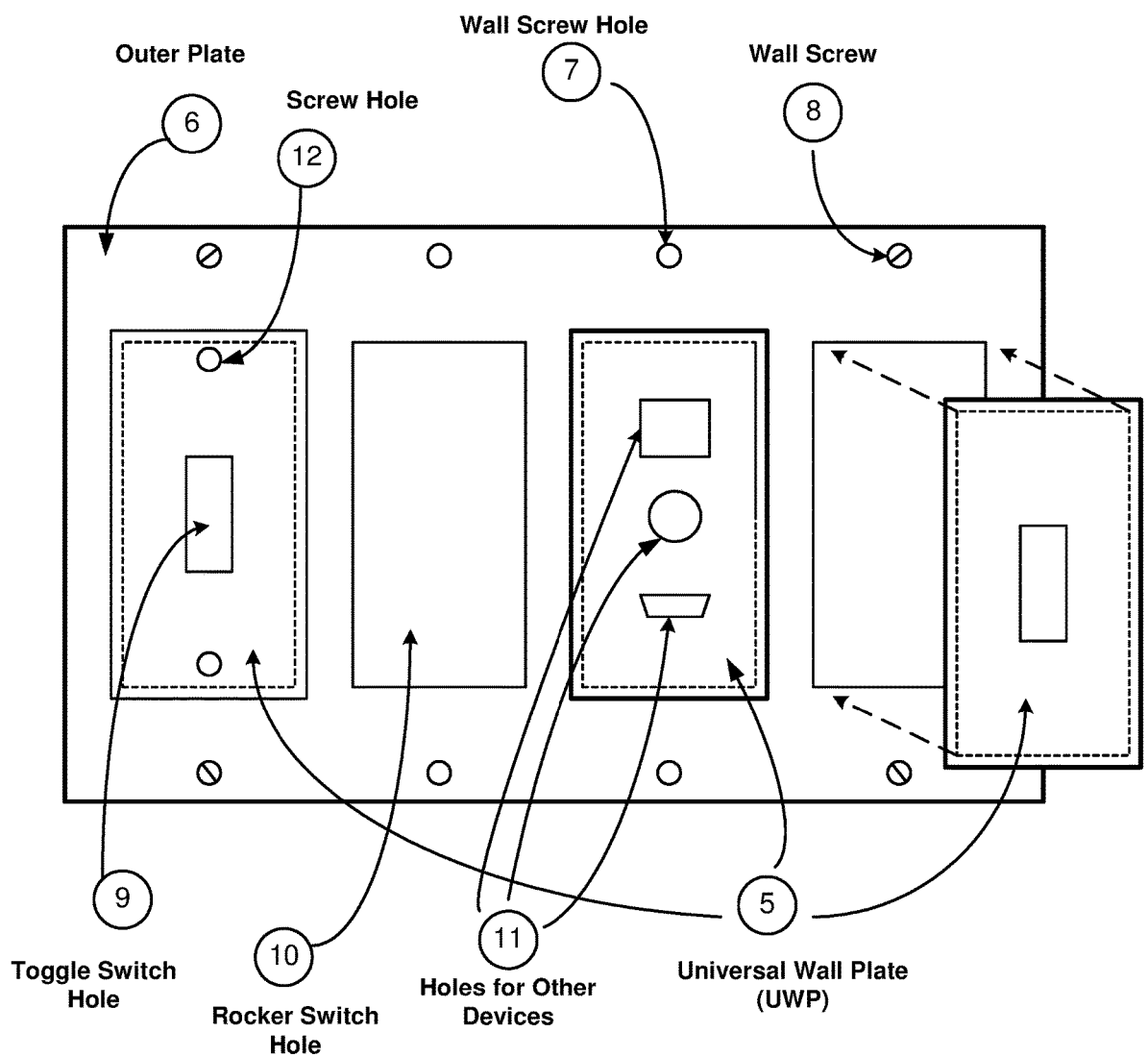
Figure 3. Universal Wall Plate

UNIVERSAL WALL PLATE FOR ELECTRICAL DEVICES

CROSS REFERENCE TO RELATED APPLICATION

None.

BACKGROUND OF THE INVENTION

Field of Invention

The present invention relates to the field of mounting electrical devices (such as switches, outlets, phone jacks, USB Connectors, cable connectors etc.) on the wall, and covering the devices with wall plates. The wall plate is also referred as face plate or cover plate.

RELATED U. S. PATENTS

| Pat. No. | Issue Date | Patentee |
|---|---|---|
| U.S. Pat. No. 7,582,830 (B2) | 2009 Nov. 1 | Joseph Claffy |
| U.S. Pat. No. 6,680,438 | 2004 Jan. 20 | Campbell, et al. |
| U.S. Pat. No. 6,051,788 | 2000 Apr. 18 | David R. Nichols |

RELATED U. S. PATENT APPLICATION PUBLICATIONS

| Publication Number | Publication Date | Applicant |
|---|---|---|
| - - - NONE - - - | | |

RELATED FOREIGN PATENT DOCUMENTS

| Foreign Doc. No. | Country Code | Publication Date | Applicant/ Patentee |
|---|---|---|---|
| - - - NONE - - - | | | |

The electrical devices such as switches and outlets available worldwide have different sizes and shapes. For electrical devices such as 120V switches/outlets in the United States and Canada; and 240V in Europe, China, India and other countries, a wall plate is required for safety to cover the high voltage wires and terminals. These switches and outlets are mounted on the walls of buildings. For cost and safety reasons, typically, these devices are mounted inside a recessed section (hole) of the wall. Some times, only one switch/outlet is installed by itself, whereas most of the times, multiple switches/outlets in different combinations are installed side-by-side. Since most of these wall plates are installed inside the buildings, the wall plate has evolved into a piece of decoration. Typically, a decorative wall plate costs more than the switch/outlet itself. These variations have resulted in having many different types (shape, size, color, decorative design etc.) of wall plates. In the United States alone, 3,000+ types (models) of wall plates are sold at the present time. This forces the manufacturers and sellers to keep a big and complex inventory of wall plates. Many times, a particular combination-plate for switches/outlets is not available at the retail store causing inconvenience to the customer, and delay to the construction/upgrade project.

Till date, there has been very little innovation in the field of wall plates. Each wall plate is built to cover a particular type of switch/outlet or a combination thereof. For example, in USA, there are two types of wall plates (1), (2) sold for 120V switches, namely for a Toggle switch (3) and a Rocker switch (4). When a home owner decides to upgrade a smaller Toggle switch with a Rocker switch or a Smart switch, he has to throw away his old wall plate and buy a new one. In upgrade/renovation projects which involve large number of electrical switches, outlets, phone jacks, USB connectors and cable connectors etc., this increases the cost of the project.

BRIEF SUMMARY OF THE INVENTION

The current invention overcomes the underlined problems cited above. A Universal Wall Plate (UWP) is a smaller plate (5) that fits to cover a hole for a device in a bigger Outer Wall Plate (6). The UWP may have one, or more, smaller holes (11) for electrical devices installed behind it. The device-holes allow a user to access electrical devices without removing the wall plate.

The UWP may be used to cover low voltage devices (12V, 24V, 48V etc.), high voltage devices (100V, 110V, 120V, 240V etc.), Direct Current devices, or Alternating Current devices. The UWP may be used in commercial buildings, residential buildings, mobile vehicles, or anywhere else where an electrical device is used. The UWP may be built and used in low cost applications like apartments, or higher priced decorative applications such as luxury houses.

In the above example of paragraph [005], if an Outer wall plate with a bigger hole (10) to accommodate a Rocker switch was originally installed, along with a UWP with a device-hole for a Toggle switch (9), the new Rocker switch could be installed without replacing the Outer wall plate. The UWP could be removed and saved by the home owner for future use. Thus, the UWP allows installation/replacement of electrical devices without replacing the Outer wall plates—a cost saving for the renovation projects.

BRIEF DESCRIPTION OF DRAWINGS

FIG. 1 illustrates an existing wall plate for a Toggle switch.

FIG. 2 illustrates an existing wall plate for a Rocker switch.

FIG. 3 illustrates the Universal Wall Plate (UWP) and an Outer wall plate.

| Reference Numerals | | |
|---|---|---|
| (1) Toggle Switch Wall Plate | (2) Rocker Switch Wall Plate | (3) Toggle Switch |
| (4) Rocker Switch | (5) Universal Wall Plate (UWP) | (6) Outer Plate |
| (7) Wall Screw Hole | (8) Wall Screw | (9) Toggle Switch Hole |
| (10) Rocker Switch Hole | (11) Device-Hole | (12) Device Screw Hole |

DETAILED DESCRIPTION OF THE INVENTION

FIG. 1 illustrates a Toggle switch (3) covered by a wall plate (1) specifically designed for the Toggle switch. FIG. 2 illustrates a Rocker switch (4) covered by a wall plate (2) with a bigger hole to accommodate the Rocker switch. When a home owner needs to upgrade his switch from older Toggle to newer Rocker switch, the home owner also has to buy a new wall plate for the Rocker switch. The UWP (5) overcomes this shortcoming.

FIG. 3 illustrates a bigger Outer wall plate (6) with four device-holes (10). Each hole can accommodate one larger electrical device such as a Rocker switch (4), or more than one smaller devices that would fit within the same space, such as two electrical outlets. A UWP with a Toggle switch hole (9), and one with three smaller holes (11) is also shown in FIG. 3. The UWP may be mounted on the outer wall plate by simply pushing in the device-hole (push-fit type UWP), or inserting screws through holes (12). Typically, an Outer wall plate (6) is mounted on the wall by inserting wall screws (8) through the wall screw holes (7).

At the time of new construction, if all outer wall plates (6) with bigger device holes (10) are installed in the building, upgrading/replacing electrical devices later would be easily and cost effectively done by installing UWPs with appropriate device holes (9), (11). Thus, UWPs will reduce the overall cost of the upgrade project. In case decorative wall plates, which are more expensive, are used in a building such as a luxury home/commercial building, the cost savings will be much higher.

The invention claimed is:

1. A Wall Plate System for mounting one or more electrical devices on a wall, the system comprising:
   an outer wall plate (6) and a Universal Wall Plate (5), wherein the outer wall plate (6) is bigger than the Universal Wall Plate (5);
   the outer wall plate (6) comprising one or more rocker switch holes (10) to accommodate one or more rocker switches (4) installed behind the holes (10), wherein the dimensions of the hole (10) are substantially the same as the dimensions of the rocker switch (4) area accessible to the user;
   the outer wall plate (6) is mountable on the wall without installing the universal wall plate (5);
   the outer wall plate (6) covers the wall area around the holes (10) while mounted on the wall;
   one or more universal wall plates (5) mountable on the outer wall plate (6) to cover one or more rocker switch holes (10), wherein the outer dimensions of the universal wall plate (5) are substantially the same as the dimensions of the rocker switch hole (10); and
   the universal wall plate (5) comprising a toggle switch hole (9) to accommodate a toggle switch (3) installed behind it, wherein the dimensions of the hole (9) are substantially the same as the dimensions of the toggle switch (3) area accessible to the user; or the universal wall plate (5) comprising one or more holes (11) to accommodate one or more electrical devices, smaller than the Rocker Switch (4), and installed behind it, wherein the dimensions of the one or more holes (11) are substantially the same as the dimensions of the areas accessible to the user of the one or more smaller electrical devices.

2. The universal wall plate (5) of claim 1 is mounted on the Outer wall plate (6) by pushing in the rocker switch hole (10); or mounted with screws in screw holes (12).

3. The universal wall plate (5) of claim 1 is used as a decorative wall plate.

4. The universal wall plate (5) of claim 1 is used for low voltage devices or high voltage devices.

5. The universal wall plate (5) of claim 1 is used for AC (Alternating Current) or DC (Direct Current) devices.

\* \* \* \* \*